United States Patent [19]

Wagai et al.

[11] Patent Number: 5,203,014

[45] Date of Patent: Apr. 13, 1993

[54] RADIO TELECOMMUNICATION DEVICE WITH A DISPLAY FOR CHANGED INFORMATION IN RECEIVED SIGNALS

[75] Inventors: Kiyoshi Wagai; Tatsuaki Sekigawa, both of Hachioji; Mitsuji Shiono, Oome, all of Japan

[73] Assignee: Kabushiki Kaisha Toshiba, Kawasaki, Japan

[21] Appl. No.: 493,462

[22] Filed: Mar. 14, 1990

[30] Foreign Application Priority Data

Mar. 15, 1989 [JP] Japan .................................. 1-63321

[51] Int. Cl.$^5$ ............................................. H04B 7/00
[52] U.S. Cl. .................................... 455/38.2; 455/38.4; 455/158.4; 340/825.27
[58] Field of Search ................. 455/158, 38, 228, 226, 455/38.1, 38.2, 38.4, 158.1, 158.2, 158.4, 226.1; 340/825.44, 825.26, 825.48, 825.27

[56] References Cited

U.S. PATENT DOCUMENTS

| | | | |
|---|---|---|---|
| 3,611,294 | 10/1971 | O'Neill | 340/825.26 |
| 4,438,433 | 3/1984 | Smoot et al. | 340/825.44 |
| 4,554,418 | 11/1985 | Toy | 364/900 |
| 4,677,434 | 6/1987 | Fascenda | 340/825.26 |
| 4,758,834 | 7/1988 | Sato et al. | 340/825.48 |
| 4,887,308 | 12/1989 | Dutton | 455/158 |
| 4,949,085 | 8/1990 | Fisch et al. | 340/825.48 |
| 5,001,471 | 3/1991 | Snowden et al. | 340/825.26 |

Primary Examiner—Reinhard J. Eisenzopf
Assistant Examiner—Edward Urban
Attorney, Agent, or Firm—Oblon, Spivak, McClelland, Maier & Neustadt

[57] ABSTRACT

A radio tele-communication apparatus of this invention is arranged as follows. A receiving circuit receives a signal including transmission information transmitted from a base station and outputs a demodulated signal. A determining circuit determines whether or not self-addressed transmission information is included in the demodulated signal output from the receiving circuit. If the determining circuit determines that the self-addressed transmission information is included in the demodulated signal, a detecting circuit compares the currently received transmission information with previously received transmission information to detect a change amount therebetween. If the change amount is larger than a predetermined amount, an informing circuit informs reception of the self-addressed transmission information.

1 Claim, 8 Drawing Sheets

RADIO TELECOMMUNICATION DEVICE WITH A DISPLAY FOR CHANGED INFORMATION IN RECEIVED SIGNALS

BACKGROUND OF THE INVENTION

1. Field of the Invention

The present invention relates to a ratio telecommunication apparatus such as a pager receiver having a function of receiving transmission information transmitted from an information source via a radio channel and displaying the received information on a display.

2. Description of the Related Art

Figure 1:
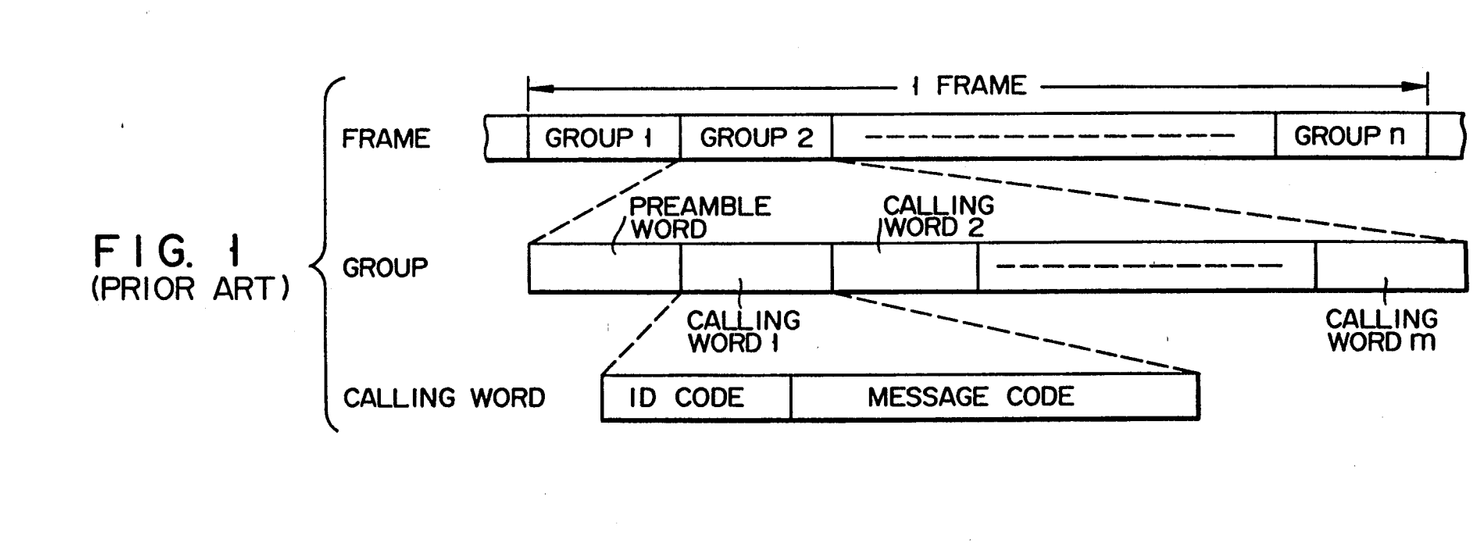
FIG. 1 is a view showing a format of a conventional paging signal.

In recent years, a system in which message information is transmitted from a base station and displayed by a pager receiver has been developed as an advanced paging system. A paging signal used in the paging system of this type has, e.g., a format as shown in FIG. 1. That is, one frame is time-divided into a plurality of groups (n groups), and each group is time-divided into a preamble word and a plurality of calling words (m words). An ID code and a message code are inserted in each calling word.

In order to call ca pager receiver, a caller dials a telephone number corresponding to the pager receiver to call a base station and sends message information to the base station. The base station generates a predetermined ID code corresponding to the pager receiver and a message code obtained by encoding the message information. The ID code and the message code are inserted in an empty calling word in a group of a plurality of groups of one frame, to which the pager receiver belongs, and are transmitted.

The pager receiver has, e.g., the following arrangement. That is, the paging signal transmitted from the base station is received by a radio circuit via an antenna, demodulated by a demodulation circuit and input to a controller. The controller collates the ID code included in the demodulated paging signal with its own ID code stored in an ID-ROM beforehand. If a coincidence is detected between the two codes upon collation, it is determined that a call is generated to its own receiver, and a ringing signal is output. This ringing signal is supplied to a speaker via a driver. Therefore, the speaker generates a ringing tone to alarm generation of the call to the owner of the receiver.

If the coincidence between the ID codes is detected, the controller performs error correction processing for the message code received subsequently to the ID code and decodes the processed code. The decoded message data is supplied from the controller to a display driver. Therefore, the message is displayed on a liquid crystal display (LCD) by the display driver. In this manner, if a call is generated, an owner of the receiver can know the message from a caller by seeing the liquid crystal display.

Recently, as an advanced information transmission system using a paging system of this type, a system in which service information such as a foreign exchange rate or a stock price is transmitted from an information source to a specific pager receiver has been developed. In a system of this type, a pager receiver requiring reception of the service information is assigned with a second ID code different from the first ID code used to perform normal calling described above. This second ID code is commonly given to all pager receivers requiring reception of the service information. In order to transmit the service information, a source of the service information calls the base station and transmits the service information. The base station generates the second ID code and a service code obtained by encoding the service information. These codes are inserted in an empty calling word of each of all groups of the paging signal and are transmitted to the pager receivers.

Each pager receiver requiring reception of the service information performs collation for the first and second ID codes. If the second ID code is detected, the service code received together with the second ID code is decoded by the controller and supplied to the display driver. The service information is displayed on the liquid crystal display. Therefore, an owner of the receiver can check the contents of the service information by seeing the display.

This system, however, has the following problems. That is, if a calling word including service information is received, the pager receiver generates, e.g., a ringing tone to alarm reception of the service information to the owner of the receiver. It becomes difficult, however, for the owner to distinguish normal calling from reception of the service information. In addition, even if service information not so important for an owner is received, a ringing tone or the like is always generated to alarm the reception to the owner. Therefore, the owner must perform an operation for stopping the ringing tone each time the ringing tone is generated, resulting in very cumbersome operation.

In order to facilitate distinguishment between normal calling and reception of service information, the arrangement may be modified such that no ringing tone is generated when the service information is received. In this case, however, the owner of the receiver may often be unaware of reception of the service information. Therefore, if a check on the service information is delayed, the owner may not be able to immediately cope with, e.g., a sudden drop in stock price or a rapid change in exchange rate.

SUMMARY OF THE INVENTION

It is an object of the present invention to provide a radio tele-communication apparatus in which an informing operation is performed only when important transmission information is received to eliminate a cumbersome operation and important transmission information can be checked immediately upon reception without a delay.

It is another object of the present invention to provide a radio tele-communication apparatus in which no specific additional information for an informing operation need be transmitted from a transmission information source side.

It is still another object of the present invention to provide a radio tele-communication apparatus in which an information length of transmission information need not be limited.

It is still another object of the present invention to provide a radio tele-communication system in which an information source side can mainly determine whether or not transmission information is important.

It is still another object of the present invention to provide a radio tele-communication system in which reception of important transmission information can be reliably informed by a radio tele-communication apparatus regardless of the type of transmission information.

In order to achieve the above objects, a radio tele-communication apparatus of the present invention is arranged as follows. That is, this apparatus comprises a receiving circuit, first determining circuit, a detecting circuit second determining circuit and an informing circuit. The receiving circuit receives a signal including transmission information transmitted from a base station and outputs a demodulated signal. The first determining circuit determines whether or not the signal output from the receiving circuit includes transmission information addressed to its own apparatus. If the first determining circuit determines that transmission information addressed to its own apparatus is included, the detecting circuit compares this currently received transmission information with previously received transmission information, thereby detecting a change amount between them. If the change amount detected by the detecting circuit is larger than a predetermined amount, the informing circuit informs reception of the transmission information.

As a result, according to the present invention, only when the contents of currently received transmission information change by a predetermined amount or more from those of previously received transmission information, reception of the transmission information is informed. That is, an informing operation is performed only when received transmission information is important. Therefore, when important information is received, the owner of the apparatus can immediately know reception of the transmission information by the informing operation and can immediately check the contents of the transmission information. Therefore, the owner can immediately cope with, e.g., a rapid change in stock price or exchange rate.

When transmission information which is not so important is received, no informing operation using a ringing tone or the like is performed. Therefore, the owner need not check the contents of all the received transmission information nor perform a manipulation for stopping the informing operation each time the transmission information is received.

Since the radio tele-communication apparatus determines whether or not received transmission information is important on the basis of the contents of the transmission information, no specific additional information for an informing operation besides the transmission information need be transmitted from the information source side. Therefore, since the information length of the transmission information is not limited by the specific additional information, a transmission efficiency of the transmission information can be increased.

In order to achieve the above objects, a radio tele-communication system of the present invention is arranged as follows. That is, this system comprises an information supply apparatus, a radio transmission apparatus connected to the information supply apparatus via a tele-communication channel, and a radio telecommunication apparatus connected to the radio transmission apparatus via a radio channel. The information supply apparatus includes input and output circuits. The input circuit inputs a transmission information and an instruction information for instructing whether or not reception of the transmission information is to be informed. A signal including these pieces of information is output from the output circuit to the radio transmission apparatus via the tele-communication channel. The radio transmission apparatus transmits the signal supplied from the information supply apparatus to the radio tele-communication apparatus via the radio channel. The radio tele-communication apparatus includes a receiving circuit, a first determining circuit, a second determining circuit and an informing circuit. The receiving circuit receives the signal transmitted from the radio transmission apparatus and outputs a demodulated signal. The first determining circuit determines whether or not the transmission information addressed to its own apparatus is included in the demodulated signal output from the receiving circuit. On the basis of the instruction information included in the demodulated signal output from the receiving circuit, the second determining circuit determines whether or not reception of the transmission information is to be informed. If the first determining circuit determines that the transmission information addressed to its own apparatus is included and the second determining circuit determines that reception of the transmission information is to be informed, the informing circuit informs reception of the transmission information.

As a result, according to the present invention, in order to transmit important transmission information, instruction information for performing an informing operation need only be added to the transmission information at the information source side. In this manner, when the transmission information is received by the radio tele-communication apparatus, it is always informed by using a ringing tone or the like. Therefore, when important transmission information is received, the owner can immediately know reception of the transmission information by the informing operation and can immediately check the contents of the transmission information. Therefore, the owner can immediately cope with a rapid change in stock price or exchange rate.

To the contrary, in order to transmit the transmission information which is not so important, instruction information indicating that no informing operation is to be performed is added to the transmission information at the information source side. In this manner, even when the transmission information is received by the radio tele-communication apparatus, no informing operation is performed by using a ringing tone or the like. Therefore, the owner need not check the contents of all the received transmission information, and a manipulation for stopping the informing operation can be eliminated.

In addition, whether or not the transmission information is important can be mainly determined at the information source side. Therefore, even if it is difficult to determine in accordance with the contents of transmission information whether or not the transmission information is important as in the case of information other than numerals, the radio telecommunication apparatus can reliably inform reception of important transmission information is received.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrates presently preferred embodiments of the invention and, together with the general description given above and the detailed description of the preferred embodiments given below, serve to explain the principles of the invention.

DETAILED DESCRIPTION OF THE PREFERRED EMBODIMENTS

1st Embodiment

Figure 2:
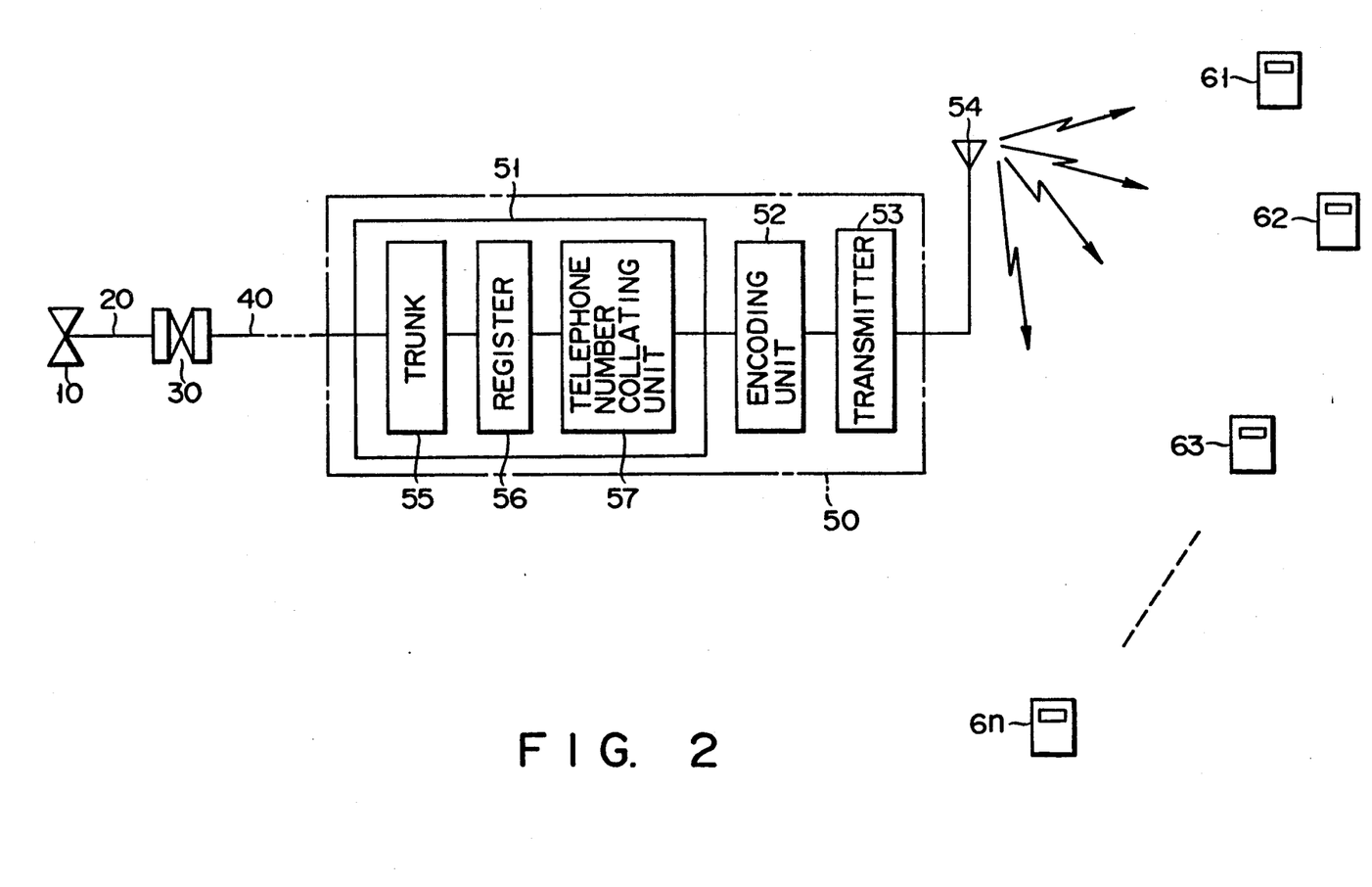
FIG. 2 is a block diagram showing an arrangement of a paging system according to an embodiment of the present invention.

An embodiment in which the present invention is applied to a paging system will be described first. FIG. 2 is a block diagram showing an arrangement of a paging system according to the first embodiment.

This system comprises a telephone set 10 belonging to a subscriber as an information source, an exchange 30 connected to the telephone set 10 via a subscriber line 20, a base station 50 connected to the exchange 30 via a tele-communication line 40, and a plurality of pager receivers 6l to 6n.

The telephones set 10 includes a circuit for calling the base station and a circuit for transmitting transmission information. The circuit for transmitting transmission information generates a DTMF signal in accordance with a dial key operation.

The base station 50 includes a radio calling unit 51, an encoding unit 52, a transmitter 53 and a transmission antenna 54. The radio calling unit 51 has a trunk 55, a register 56 and a telephone number collating unit 57. The trunk 55 monitors and controls the tele-communication line 40. The register 56 stores a telephone number of a pager receiver and message information or service information supplied from the telephone set 10 via the exchange 30. The telephone number collating unit 57 collates the telephone number with telephone numbers of the pager receivers 6l to 6n stored in advance. If a corresponding telephone number is present, the unit 57 generates an ID number corresponding to the telephone number, activates the encoding unit 52, and outputs the ID number and the message information or service information to the unit 52 at a predetermined timing. The encoding unit 52 encodes the ID number and the message information or service information. An ID code and a message code or service code output from the unit 52 are modulated by the transmitter 53 and transmitted from the transmission antenna 54 to the pager receivers 6l to 6n.

Figure 3:
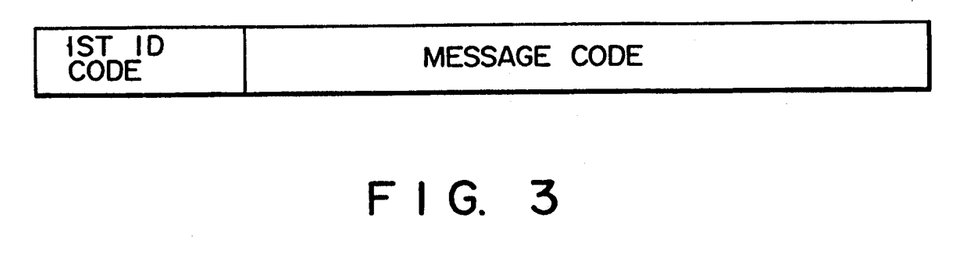
FIGS. 3 and 4 are views showing formats of signals used in the system shown in FIG. 2.
Figure 4:
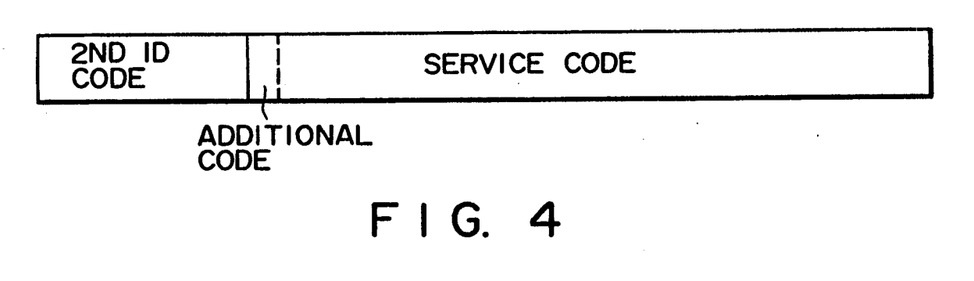

FIG. 3 shows a format of a calling word transmitted from the base station 50 upon normal calling. This calling word is constituted by a first ID code and a message code. The first ID code is specific for each of the pager receivers 6l to 6n and assigned to all the pager receivers 6l to 6n. FIG. 4 shows a format of a calling word transmitted from the base station 50 in order to transmit service information. This calling word is constituted by a second ID code, an additional code and a service code. Of these codes, the second ID code is commonly assigned to only pager receivers requiring reception of service information. The additional code is used to designate whether reception or not of service information is to be alarmed to a pager receiver by a ringing tone and is composed of, e.g., one bit.

Figure 5:
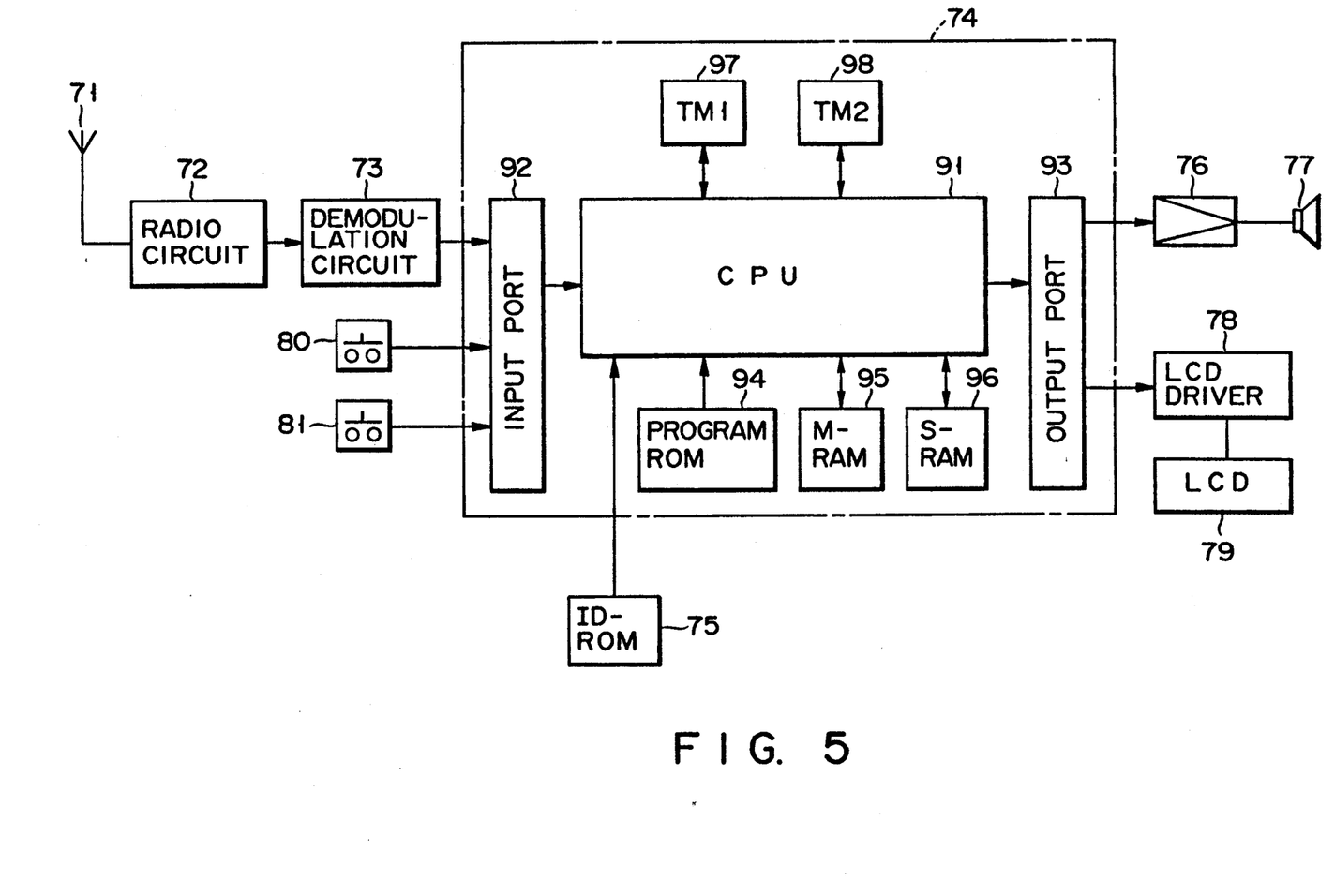
FIG. 5 is a block diagram showing an arrangement of a pager receiver used in the system shown in FIG. 2.

Of the pager receivers 6l to 6n, a pager receiver having a service information receiving function is arranged as follows. FIG. 5 is a block diagram showing an arrangement of the pager receiver.

A paging signal transmitted from the base station 50 is received by a radio circuit 72 via an antenna 71, demodulated by a demodulation circuit 73 and supplied to a control circuit 74. The control circuit 74 is constituted by, e.g., a microcomputer. This microcomputer has a central processing unit (CPU) 91, an input port 92, an output port 93, a program ROM 94, a message memory (M-RAM) 95, a service information memory (S-RAM) 96 and two timers 97 and 98. The CPU 91 executes a predetermined control operation in accordance with programs stored beforehand in the program ROM 94. An ID-ROM 75 is connected to the CPU 91. A first ID code for normal calling and a second ID code for receiving service information are written beforehand in the ID-ROM 75.

The input port 92 is connected to the demodulation circuit 73, a stop switch 80 and a display switch 81. Each of the stop and display switches 80 and 81 is constituted by a push button switch. When the push button is depressed, the switch 80 or 81 generates an operation signal and supplies the signal to the input port 92. The output port 93 is connected to a speaker driver 76 and an LCD driver 78. The speaker driver 76 generates a ringing signal in accordance with a drive signal output from the CPU 91 via the output port 93 and supplies the ringing signal to a speaker 77, thereby generating a ringing tone from the speaker 77. In accordance with message display data or service information display data output from the CPU 91 via the output port 93, the LCD driver 78 causes a liquid crystal display (LCD) 79 to display a message corresponding to the message display data or service information corresponding to the service information display data.

The message memory 95 and the service information memory 96 are constituted by RAMs. These RAMs have a plurality of memory areas for storing a plurality of message codes and a plurality of service information codes, respectively. The timers 97 and 98 are constituted by, e.g., counters. Different upper count limits are preset for these counters. Each of the timers 97 and 98 starts a counting operation when a count start signal is supplied from the CPU 91 and generates a time over signal when the count reaches the predetermined upper count limit.

An operation of the paging system having the above arrangement will be described below.

(1) Operation for performing normal calling

Assume that a certain subscriber dials a telephone number of the pager receiver 61 by using his or her own telephone set in order to call the owner of the pager receiver 61. In this case, the telephone set is connected to the base station 50 via the exchange 30. In this state, the telephone number of the pager receiver 61 is transmitted to the radio calling unit 51 of the base station 50 via the exchange 30. The transmitted telephone number is stored in the register 56 of the unit 51. Assume that the subscriber manipulates dial keys to input message information such as a telephone number of a place to contact. A DTMF signal corresponding to the message information is generated from the telephone set and transmitted to the base station 50 via the exchange 30. The message information consisting of the DTMF signal is received by the radio calling unit 51 of the base station 50 and stored in the register 56.

When the telephone number is transmitted, the telephone number collating unit 57 of the base station 50 collates the transmitted telephone number with telephone numbers of the pager receivers 6*l* to 6*n* stored in advance. If a corresponding telephone number is found, a first ID number corresponding to the telephone number and the message information stored in the register 56 are supplied to and encoded by the encoding unit 52. A first ID code and a message code (FIG. 3) output from the unit 52 are modulated by the transmitter 53 and transmitted from the transmission antenna 54 to the pager receivers 6*l* to 6*n*.

Figure 6:
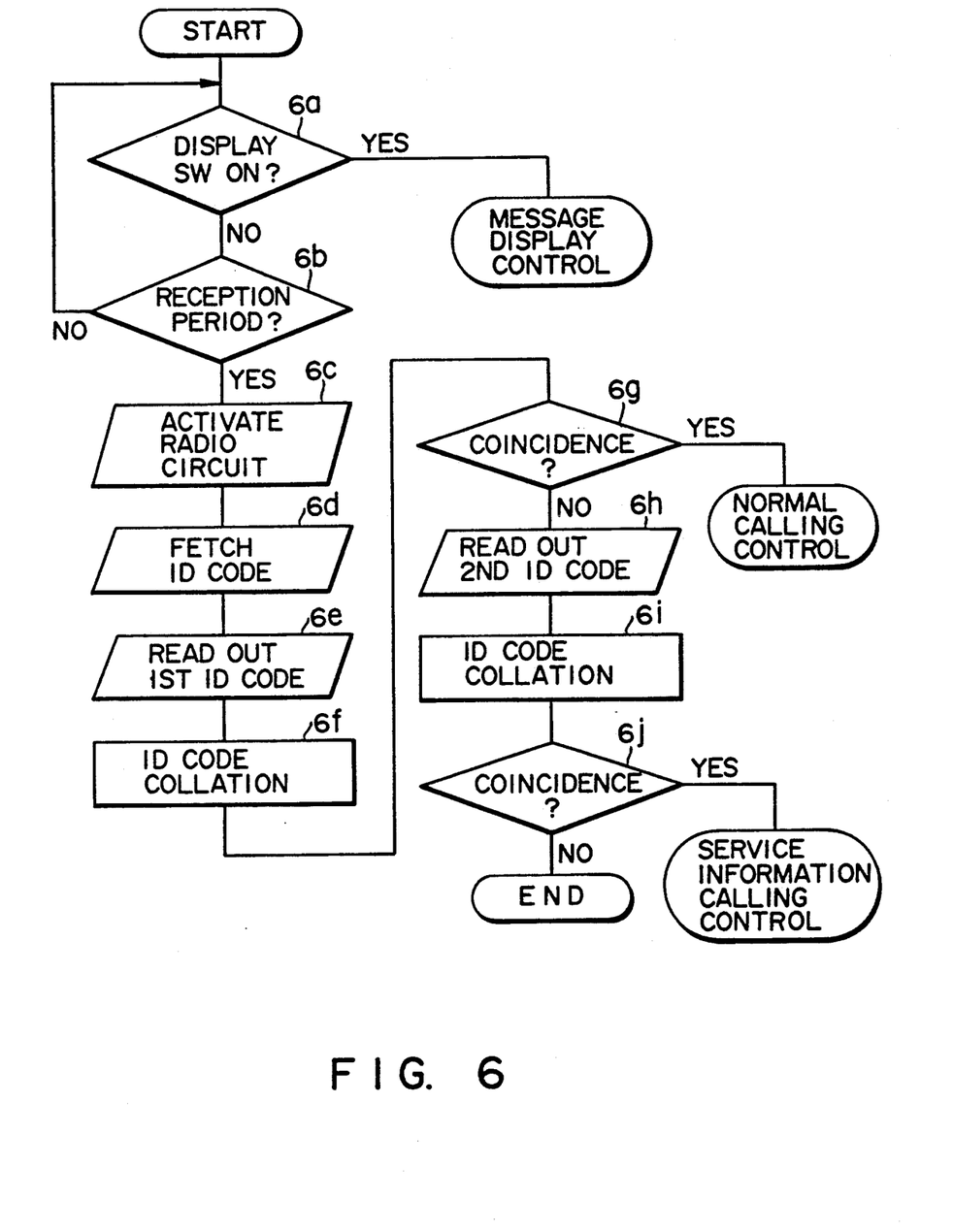
FIGS. 6, 7, 8A and 8B are flow charts for explaining control sequences of a control circuit of the pager receiver shown in FIG. 5.

Each of the pager receivers 6*l* to 6*n* is performing a calling standby operation. That is, the CPU 91 of the control circuit 74 repeatedly monitors whether the display switch 81 is turned on (step 6*a*) and whether a reception period of its own receiver is started (step 6*b*), by checking occurrences of a synchronization word included in a paging signal as shown in FIG. 6.

In this state, if the reception period of its own receiver is started, the control circuit 74 performs control for receiving a paging signal. That is, in step 6*c*, the radio circuit 72 is activated. The paging signal is received by the radio circuit 72 and demodulated by the demodulation circuit 73. In step 6*d*, an ID code in the demodulated paging signal output from the demodulation circuit 73 is fetched in the CPU 91. In step 6*e*, the first ID code is read out from the ID-ROM 75. In step 6*f*, the received ID code and the first ID code are collated with each other. If a coincidence is found between the two ID codes as a result of collation, the control circuit 74 determines that a normal call with respect to its own apparatus is generated and executes normal calling control.

Figure 7:
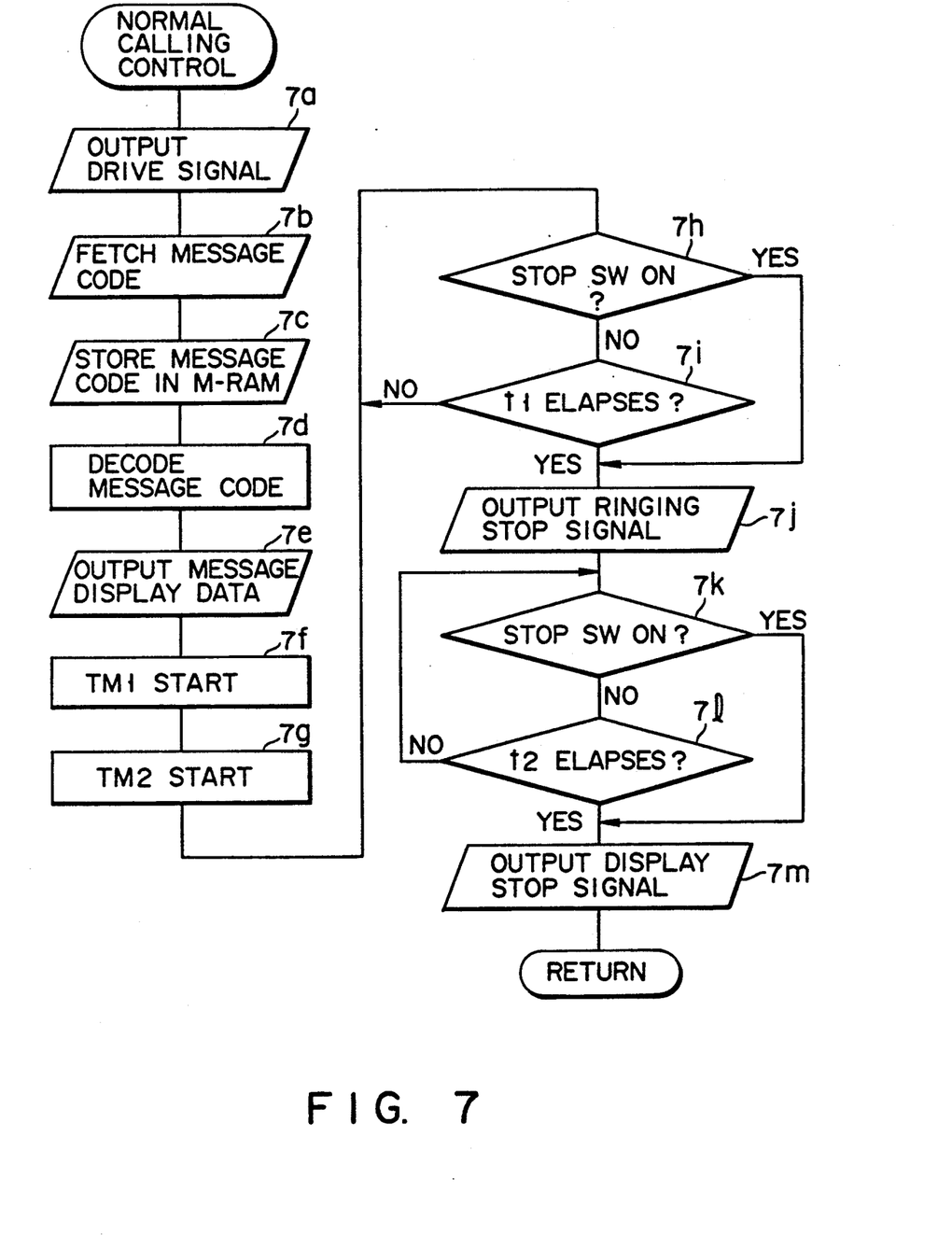

That is, as shown in FIG. 7, in step 7*a*, a drive signal is output to the speaker driver 76. The driver 76 outputs a ringing signal to generate a ringing tone from the speaker 77. Therefore, the owner of the receiver can notice generation of the call by this ringing tone. In step 7*b*, the message code in the demodulated paging signal is fetched. This message code is temporarily held in the register of the CPU 91 and stored in the M-RAM 95 in step 7*c*. In step 7*d*, the message code is decoded. Message display data obtained by this decoding is output from the LCD driver 78 in step 7*e*. The LCD 79 displays the currently received message. Therefore, the owner can check the received message by seeing the LCD 79.

When generation of the ringing tone and display of the message are started, the control circuit 74 executes control for stopping ringing tone generation and message display. That is, as shown in FIG. 7, in steps 7*f* and 7*g*, count start signals are output to the timer (TM1) 97 and the timer (TM2) 98, respectively. Therefore, the timers 97 and 98 start counting operations. Subsequently, in steps 7*h* and 7*i*, whether the stop switch 80 is depressed and whether a time over signal is generated from the timer 97 are repeatedly monitored, respectively. In this state, assume that the owner depresses the stop switch 80. As a result, a ringing tone stop signal is output to the speaker driver 76 in step 7*j*. Therefore, generation of the ringing tone from the speaker 77 is stopped. Even if the stop switch 80 is not depressed, when a first time t1 (e.g., five seconds) elapses after generation of the ringing tone is started, a time over signal is generated from the timer 97, and a ringing tone stop signal is output in step 7*j* accordingly. Therefore, generation of the ringing tone is automatically stopped.

When generation of the ringing tone is stopped, in steps 7*k* and 7*l*, whether the stop switch 80 is depressed and whether the time over signal is generated from the timer 98 are repeatedly monitored, respectively. In this state, if the owner depresses the switch 80 or a second time t2 (e.g., 20 seconds) elapses after display of the message is started, a display stop signal is output to the display driver 78 in step 7*m*. Therefore, display of the message performed by the LCD 79 is ended.

In the calling standby state, if the display switch 81 is depressed, the control circuit 74 selectively reads out message codes from the message memory 95 to execute control for causing the LCD 79 to display messages. Therefore, even after display of a message on the LCD 79 disappears, the same message can be displayed again by depressing the display switch 81.

(2) Operation for transmitting service information

Assume that a subscriber as a service information source performs calling of a specific telephone number by using the telephone set 10 in order to transmit service information such as a stock price or a foreign exchange rate to pager receivers requiring reception of the service information. As a result, the telephone set 10 is connected to the base station 50 via the exchange 30. In this state, the specific telephone number is transmitted to the radio calling unit 51 of the base station 50 via the exchange 30. The transmitted telephone number is stored in the register 56 of the unit 51. The information source subscriber operates the dial keys of the telephone set 10 to input additional information for designating whether a ringing tone is to be generated and to input the service information. A DTMF signal corresponding to the additional information and the service information is generated by the telephone set 10 and transmitted to the base station 50 via the exchange 30. The additional information and the service information consisting of the DTMF signal are received by the radio calling unit 51 at the base station 50 and are stored in the register 56.

Upon reception of the telephone number, the telephone number collating unit 57 of the base station 50 collates the received telephone number with prestored telephone numbers of the pager receivers 6*l* to 6*n*. If the received telephone number coincides with a specific telephone number, a second ID number corresponding to the specific telephone number and the additional information and the service information stored in the register 56 are supplied to and encoded by the encoding unit 52. A second ID code, an additional code and a service code (FIG. 4) output from the unit 52 are modulated by the transmitter 53 and transmitted from the transmission antenna 54 to the pager receivers 6*l* to 6*n*.

Each of the pager receivers 6*l* to 6*n* performs calling standby control in accordance with a sequence shown in FIG. 6. Note that in the control sequence shown in FIG. 6, a sequence from step 6*a* to step 6*g* is the same as that for normal calling described above.

Referring to FIG. 6, the received ID code is collated with the first ID code in step 6*f*. If a non-coincidence is determined between the two ID codes in code from the ID-ROM 75 in step 6*h*. In step 6*i*, the received ID code is collated with the second ID code. In step 6*j*, whether the ID codes coincide with each other is checked on the basis of the collation result. If a coincidence is determined, calling control for the service information is executed.

Figure 8A:
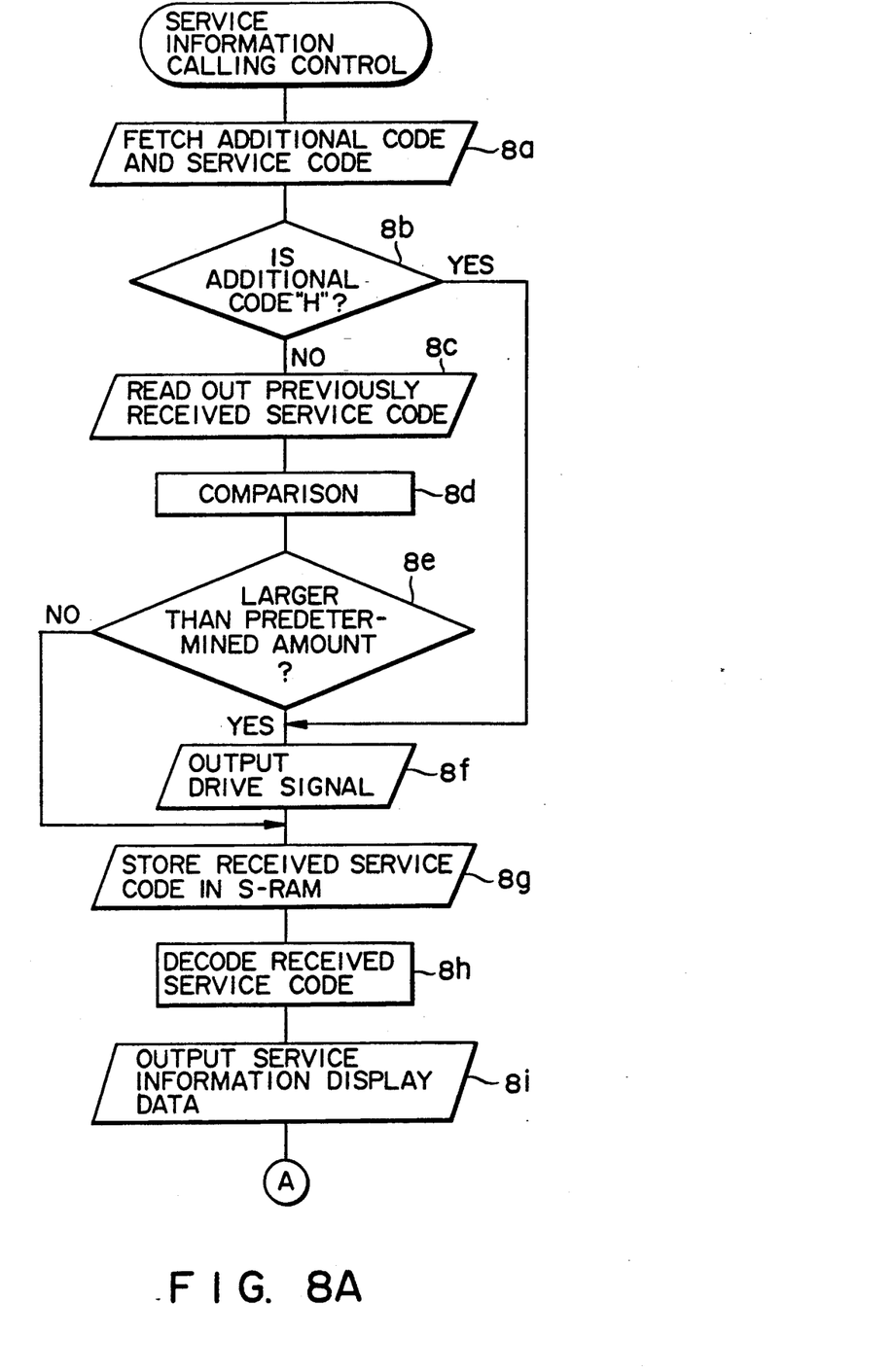

That is, in step 8a shown in FIG. 8A, the additional and service codes output subsequently to the ID code from the demodulation circuit 73 are fetched. In step 8b, whether the additional code is at level "H" or "L" is checked. If the additional code is at level "H", the control circuit 74 determines that the ringing tone generation designation from the information source is received and advances the flow to step 8f. In step 8f, a drive signal is output to the speaker driver 76. Therefore, a ringing tone is generated from the speaker 77. Therefore, even if the owner of the pager receiver carries the receiver in, e.g., his or her pocket or bag, he or she can reliably know reception of the service information by the ringing tone.

If the additional code is at level "L", the control circuit 74 advances the flow to step 8c. In step 8c, a previously received service code is read out from the S-RAM 96. In step 8d, the currently received service code and the previously received service code are compared with each other to detect a difference therebetween. For example, if the service information represents a stock price, a difference between the currently received stock price and the previously received stock price is detected. Subsequently, in step 8e, whether the difference between the two service codes is larger than a predetermined amount is checked. If it is determined that the difference is larger than the predetermined amount, the flow advances to step 8f. In step 8f, a drive signal is output to the speaker driver 76 as described above. Therefore, the ringing tone is generated from the speaker 77 to alarm reception of the service information to the owner. Therefore, also in this case, the owner can reliably know reception of the service information. That is, when the change amount in service information is larger than the predetermined value, a ringing tone is automatically generated without the ringing tone generation designation by an information source subscriber.

In step 8g, the currently received service code is stored in the S-RAM 96. In step 8h, the service code is decoded. Service information display data obtained by this decoding is supplied to the LCD driver 78 in step 8i. The service information is displayed on the LCD 79. Therefore, the owner can check the contents of the service information by seeing the LCD 79.

If it is determined in step 8e that the difference is smaller than the predetermined value, the flow skips step 8f and advances to step 8g. In step 8g, the service code is stored in the S-RAM 96. In steps 8h and 8i, control for displaying the service information on the LCD 79 is performed. That is, in this case, since the change amount in service information is small, it is determined that a ringing tone need not be generated to alarm reception of the service information to the owner, and only storage of the service information in the S-RAM 96 and its display on the LCD 79 are performed. Therefore, when a change in service information is small, i.e., when service information is not so important, the owner of the receiver is not called by a ringing tone.

Figure 8B:
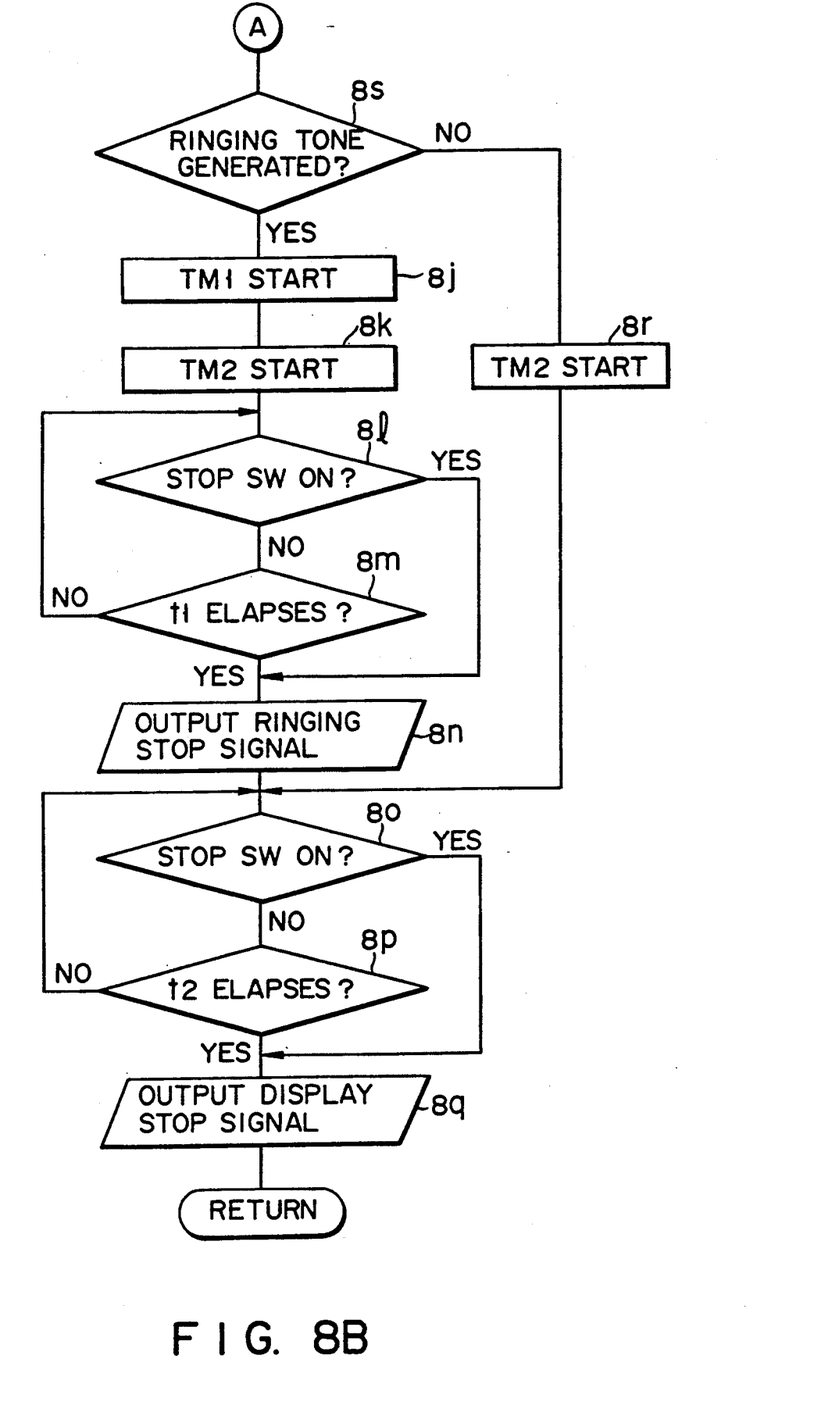

After the service information is displayed, the control circuit 74 performs display stop control and ringing tone stop control if a ringing tone is generated. That is, as shown in FIG. 8B, in step 8s, whether a ringing tone is generated is checked. If the ringing tone is generated, start signals are output to the timers 97 and 98 in steps 8j and 8k, respectively. Then, the timers 97 and 98 start counting operations. In steps 8l and 8m, whether the stop switch 80 is depressed and whether the timer 97 outputs a time over signal are repeatedly monitored. In this state, if the first time t1 elapses after generation of the ringing tone is started and the timer 97 outputs the time over signal, or if the stop switch 80 is depressed before the first time elapses, a ringing tone stop signal is output to the speaker driver 76 in step 8n. Therefore, the speaker 77 stops generation of the ringing tone.

In steps 8o and 8p, whether the stop switch 80 is depressed and whether the timer 98 outputs a time over signal are repeatedly monitored, respectively. In this state, if the second time t2 elapses after generation of the ringing tone is started and the timer 98 outputs the time over signal, or if the stop switch 80 is depressed before the second time elapses, a display stop signal is output to the LCD driver 78 in step 8q. Therefore, the LCD 79 stops display of the service information.

If it is determined in step 8s that no ringing tone signal is generated, the start signal is supplied to only the timer 98 in step 8r. The flow advances to step 8o, and the control for stopping display of the service information on the LCD 79 is performed.

As described above, in this embodiment, when the pager receiver receives service information, a difference between the currently received service information and previously received service information stored in the S-RAM 96 is detected. If the difference is larger than a predetermine value, a ringing tone is generated. Therefore, when important service information is received, reception of the service information is reliably alarmed to the owner of the pager receiver by the ringing tone even if he or she carries the receiver in, e.g., his or her pocket or bag. Therefore, the owner can always check the important service information immediately upon reception and thereby can rapidly cope with it. If the difference is smaller than the predetermined amount, i.e., if service information which is not so important is received, no ringing tone is generated. Therefore, when service information which is not so important is received, the owner of the pager receiver need not see the LCD 79 nor perform a manipulation for stopping a ringing tone, thereby reducing a load on the owner.

In addition, according to this embodiment, in order to transmit service information, an information source side adds additional information for designating whether a ringing tone is to be generated by the pager receiver. When the service information is received by the pager receiver, whether the ringing tone is to be generated is determined on the basis of the contents of the additional information, and generation of the ringing tone is controlled in accordance with the determination result. Therefore, even if service information such as a news constituted by character information which is not easily, quantitatively determined by the pager receiver is to be transmitted, the pager receiver can generate a ringing tone since the information source side adds the additional information for generating the ringing tone to the service information before transmission. Therefore, when important service information is received, the owner of the receiver can immediately know reception of the service information regardless of the type of service information and thereby can immediately check the contents of the service information without any delay.

Note that the present invention is not limited to the above embodiment but can be variously modified as follows. That is, in the pager receiver, when important service information is received, a ringing tone different from that generated upon normal calling may be generated. In order to generate different ringing tones, different tone colors (frequencies), different intermittent periods or the like may be used. Instead of a ringing tone, a voice synthesizing circuit may be used to generate a voice message indicating that a normal call is generated and a voice message indicating that important service information is received. When service information is received, a light-emitting element such as a light-emitting diode may be turned on or flashed on and off in addition to generation of a ringing tone or voice message. Furthermore, reception of service information may be alarmed by vibrations.

Two different ID codes may be used to transmit service information. In this case, if one of the ID codes is selected, a ringing tone is generated by the pager receiver, while no ringing tone is generated if the other ID code is selected. In this case, since no additional information need be used, the bit length of service information can be increased accordingly.

A plurality of different ID codes may be used to transmit service information. In this case, different types of pieces of service information are transmitted in correspondence with the respective ID codes. This arrangement can be realized by providing, in each pager receiver, an ID-ROM which stores an ID code corresponding to service information required by the owner of the receiver.

In the pager receiver, received service information may be stored in the S-RAM only when it is determined to be important. The S-RAM may store only the latest service information or a plurality of (e.g., three) pieces of service information in an order of reception. When a plurality of pieces of service information are stored in this manner, a plurality of pieces of previously received service information can be read out from the S-RAM and displayed on the LCD. Therefore, the owner of the receiver can precisely check a change in stock price or foreign exchange rate.

In the pager receiver, a plurality of threshold values for checking whether or not received service information is important may be set to compare a difference between a currently received service code and a previously received service code with each threshold value. In this case, importance of service information is determined on the basis of the comparison result, and an alarming operation is controlled on the basis of the determination result. For example, assume that two threshold values are set to determine the importance by three levels. In this case, if the importance is determined to be medium, an intermittent tone having an intermittent period different from that of a ringing tone generated upon normal calling is output. If the importance is determined to be low, no ringing tone is generated. The rank of importance may be displayed together with the service information. In this manner, the owner of the receiver can check the importance of service information more precisely. An additional function may be provided for the pager receiver so that the owner of the receiver can arbitrarily set the threshold value. In this manner, each owner can freely set a reference for determining the importance of service information.

The present invention can be applied to transmission of not only service information but also message information. That is, in the first example, a message source side, i.e., a caller adds or inserts designation information for designating whether a ringing tone is to be generated to or in message information and transmits the message information to a base station. The base station encodes the designation information and the message information and transmits them to the pager receiver. The pager receiver checks whether the designation information designates that a ringing tone is to be generated. If the pager receiver determines that the ringing tone is to be generated, it generates the ringing tone.

The second example is applied to a system in which message information is quantitatively represented. That is, the pager receiver detects a change amount in received message information. If the change amount is larger than a predetermined amount, a ringing tone is generated.

In the third example, a plurality of ID codes are used to control generation of a ringing tone. That is, a telephone number for which a ringing tone is generated and a telephone number for which a ringing tone is not generated are set in each pager receiver. A message source side, i.e., a caller selects the telephone number in accordance with importance of a message to perform calling. A base station generates an ID code corresponding to the telephone number selected by the caller and transmits a message code. The pager receiver receives these codes and checks whether the ID code corresponds to generation of a ringing tone. If the ID code corresponds to generation of a ringing tone, the receiver generates a ringing tone.

In addition to a paging system, the present invention can be similarly applied to another radio telecommunication system such as a mobile telephone system or a portable telephone system. The type and contents of information to be transmitted are not particularly limited.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A radio receiver comprising:
    receiving means for receiving signals broadcast over a predetermined radio channel;
    first signal detecting means coupled to said receiving means for detecting a first predetermined signal sequence containing a first ID code;
    second signal detecting means coupled to said receiving means for detecting a second predetermined signal sequence containing a second ID code and an additional code, a new message signal sequence;
    first alarming means coupled to said first signal detecting means for, when said first signal detecting means detects the first predetermined signal sequence containing the first ID code, alarming a user of the radio receiver;
    determining means coupled to said second signal detecting means for determining whether or not the additional code detected by said second signal detecting means is an alarm instruction code;
    amount-of-change detecting means for, comparing the new message signal sequence detected by said second signal detecting means with previously received message signal sequence and for detecting an amount of change between the new message signal sequence and the previously received message signal sequence, when said determining means determines that the additional code is not the alarm instruction code; and second alarming means for, alarming the user of the radio receiver and displaying the new message signal sequence, when said determining means determines that the additional code is the alarm instruction code and the amount of change detected by said amount-of-change detecting means exceeds a predetermined level.

* * * * *